United States Patent [19]

Gründken et al.

[11] 4,250,989
[45] Feb. 17, 1981

[54] CURVED SECTION AND GUIDE ASSEMBLY

[75] Inventors: Dieter Gründken; Bodo Kerklies, both of Lunen, Fed. Rep. of Germany

[73] Assignee: Gewerkschaft Eisenhutte Westfalia, Lunen, Fed. Rep. of Germany

[21] Appl. No.: 32,238

[22] Filed: Apr. 20, 1979

[30] Foreign Application Priority Data

Apr. 24, 1978 [DE] Fed. Rep. of Germany ....... 2817949

[51] Int. Cl.³ .................. B65G 19/00; B65G 23/00
[52] U.S. Cl. .................................. 198/729; 198/735; 198/842
[58] Field of Search ............... 198/721, 725, 727, 728, 198/729, 735, 842, 860, 841, 839

[56] References Cited

U.S. PATENT DOCUMENTS

| 2,801,730 | 8/1957 | Strickler | 198/860 |
| 3,266,619 | 8/1966 | Leach | 198/729 X |
| 3,669,244 | 6/1972 | Pagdin | 198/860 |

FOREIGN PATENT DOCUMENTS

| 2065424 | 10/1973 | Fed. Rep. of Germany | 198/725 |
| 1456338 | 10/1966 | France | 198/729 |
| 1159765 | 7/1969 | United Kingdom | 198/727 |

Primary Examiner—Robert B. Reeves
Assistant Examiner—Douglas D. Watts
Attorney, Agent, or Firm—Thompson, Birch, Gauthier & Samuels

[57] ABSTRACT

A curved section and guide assembly is provided for a scraper-chain conveyor. The assembly comprises a curved conveyor section and a guide for guiding the scraper assembly of the conveyor round the curve. The curved conveyor section has a curved inner wall, a curved outer wall and a floor panel which define upper and lower runs for the scraper assembly which is constituted by a chain and a plurality of scrapers secured thereto. The guide is constituted by two pulley wheels which are independently rotatably mounted on a vertical axle extending upwardly from a base plate arranged beneath the pulley wheels. A cover plate is arranged above the pulley wheels. The pulley wheels extend through the inner wall of the curved conveyor section, both the base plate and the cover plate being attached to said inner wall. Both the floor panel and the cover plate extend towards the axle. The upper end of the axle is supported by a carrier plate which extends over the cover plate and is detachably connected thereto.

16 Claims, 4 Drawing Figures

CURVED SECTION AND GUIDE ASSEMBLY

BACKGROUND TO THE INVENTION

This invention relates to a curved section and guide assembly for a scraper-chain conveyor.

In order to direct the scraper assembly of a scraper-chain conveyor around a curve in as friction-free a manner as possible, it is known to use an assembly having a curved conveyor section and guide means constituted by two vertically spaced, independently rotatable pulley wheels. The scraper or the chain of the scraper assembly bear radially against the upper pulley wheel when in the upper (conveying) run, and bear radially against the lower pulley wheel when in the lower (return) run. In operation, the pulley wheels are rotated by their interaction with the scrapers (or by their interaction with the drive chain of the scraper assembly), and they conduct the scraper assembly around the curve with only low friction losses.

In this type of assembly, the vertical axle which carries the pulley wheels is held between an upper, cover plate and a base plate of a housing which accommodates the pulley wheels. The base plate and the cover plate are fixed to the inner curved wall of the curved conveyor section. Since the pulley wheels penetrate the inner curved wall of the curved conveyor section (to enable them to contact the scraper assembly), the cover plate is connected to said inner wall only at the ends of the curved conveyor section. This is to be contrasted with the base plate which is connected to said inner wall along the entire length of the latter. The floor panel of the curved conveyor section (which separates the two runs of the scraper assembly) extends through the pulley wheel housing, and is bolted to the base plate and the cover plate at the edge of the housing remote from the curved conveyor section.

This type of assembly has a number of disadvantages. In particular, the fitting and removal of the pulley wheels are difficult and time-consuming. For example, during removal, the vertical axle must first be withdrawn upwardly from the housing. Then, the pulley wheels have to be extracted radially, which can only be done once the bolted connection of the floor panel to the cover plate and the base plate is released. When anti-friction bearings are used for rotatably mounting the pulley wheel on the axle, fitting and removal are rendered considerably more difficult because the inner and outer races of the anti-friction bearings are difficult to put together and withdraw, particularly in the enclosed position between the base plate and the cover plate. A further disadvantage is that the pulley wheel housing is expensive to make, leads to considerable production costs, and makes handling and transport in mine roadways and galleries difficult.

The aim of the invention is to produce a curved section and guide assembly which enables the pulley wheels to be fitted and removed more easily and quicker.

SUMMARY OF THE INVENTION

The present invention provides a curved section and guide assembly for a scraper-chain conveyor, the assembly comprising a curved conveyor section and a guide for guiding the scraper assembly of the conveyor round the curve, the curved conveyor section having a curved inner wall, a curved outer wall and a floor panel which define upper and lower runs for the scraper assembly which is constituted by a chain and a plurality of scrapers secured thereto, and the guide being constituted by two pulley wheels which are independently rotatably mounted on a vertical axle extending upwardly from a base plate arranged beneath the pulley wheels, a cover plate being arranged above the pulley wheel, the pulley wheels extending through the inner wall of the curved conveyor section, both the base plate and the cover plate being attached to said inner wall, and both the floor panel and the cover plate extending towards the axle, wherein the upper end of the axle is supported by a carrier plate which extends over the cover plate and is detachably connected thereto.

With this type of assembly, it is possible to fit and remove the pulley wheels and the axle as a single unit. This unit can be put together in workshops where more favourable conditions exist for assembly and repair than in mine roadways and galleries. The fitting of this unit can be carried out quickly and simply with the aid of a hoist or a small crane. The pulley wheel housing of this assembly (which is constituted substantially by the floor panel, the cover plate and the base plate) leads to a considerable saving of material which leads to reduced production costs. Such a housing is, however, very stable as it can be permanently welded to the inner wall of the curved conveyor section without this preventing easy and rapid fitting and removal of the pulley wheels.

Advantageously, in use, the pulley wheels guide the inner ends of the scrapers of the scaper assembly.

Gusset plates may be provided at each end of the curved conveyor section, each gusset plate extending from the inner wall of the curved conveyor section towards the pulley wheels. Preferably, the floor panel, the cover plate and the base plate are connected together in regions adjacent to the gusset plates, and spacers are provided between the base plate and the floor panel, and between the floor panel and the cover plate. The positioning of the connection means for the floor panel, the cover plate and the base plate at these regions increases the stability of the housing without hindering the fitting and removal of the pulley wheels. These regions are particularly stable for constructional reasons, so that bracing forces are taken up without the curved conveyor section being subjected to excessive bending or torsional forces.

Advantageously, the spacers are provided with laterally accessible openings which permit the floor panel, the cover plate and the base plate to be connected together by means of nuts and bolts. Spacers of this form permit the use of short bolts, so there is no need for long bolts which extend right through the housing. Preferably, a first set of nuts and bolts connect the cover plate and the floor panel, and a second set of nuts and bolts connect the floor panel and the base plate. Here, both sets of bolts can be relatively short, and the lateral openings in the spacers enable the nuts to be screwed on and off the bolts.

Conveniently, the first set of nuts and bolts also connects the carrier plate to the cover plate. Here, the carrier plate extends generally diametrically across the housing, and so increases the stability of the housing.

Advantageously, the base plate extends outwardly of the inner wall of the curved conveyor section at least as far as the outer wall of the curved conveyor section and is connected thereto. This feature increases the stability of the curved conveyor section as the base plate forms a secure abutment on the mine floor, and acts as a loadable stabiliser for the outer wall of the curved conveyor section.

Preferably, a first guard plate is pivotally connected to the carrier plate, the first guard plate covering that part of the assembly remote from the curved conveyor section, and a second guard plate is attached to the carrier plate, the second guard plate covering the space between the carrier plate and the cover plate. These guard plates prevent mineral fragments entering the housing and jamming the pulley wheels. They also prevent operator injury by removing hand access to the rotatable pulley wheels.

Conveniently, one end portion of the lower run of the curved conveyor section is provided with a guide wedge for guiding, in use, the outer end of the scrapers of the scraper assembly. This guide wedge co-operates with the wedge-shaped ends of the scrapers to provide a lead-in guide for the scrapers as they enter the curved conveyor section. This leads to a considerable saving in production costs as this guide wedge is situated only at one end of the curved conveyor section, and not along its entire length as was the case with known assemblies.

Advantageously, at least one guide fork is provided in a region remote from the curved conveyor section, the or each guide fork having a first arm which extends over, and slidably contacts, the upper pulley wheel, and a second arm which extends between, and slidably contacts, the two pulley wheels. The guide fork(s) provide additional guidance for the pulley wheels in their planes or rotation. This additional guidance counteracts torques which, owing to the weight of the scrapers or the jamming of mineral fragments between the scrapers and the floor panel of the curved conveyor section, act axially on the circumferential edge portions of the pulley wheels. Such axial loads could cause considerable loading on the pulley wheel bearings.

Preferably, there are two guide forks each of which is arranged diametrically opposite a transition zone between the inner wall of the curved conveyor section and the circumferential edge portions of the pulley wheels. This positioning of the guide forks has two advantages. Firstly, they are easily accessible for monitoring, lubrication and easy replacement or repair. Secondly, they are positioned at the zones where the axial load on the pulley wheels is likely to be greatest.

Advantageously, the faces of the arms of the guide forks which slidably contact the pulley wheels are coated with a wear-resistant material.

The invention also provides a curved section and guide assembly for a scraper-chain conveyor, the assembly comprising a curved conveyor section and a guide for guiding the scraper assembly of the conveyor round the curve, the curved conveyor section having a curved inner wall, a curved outer wall and a floor panel which define upper and lower runs for the scraper assembly which is constituted by a chain and a plurality of scrapers secured thereto, and the guide being constituted by two pulley wheels which are independently rotatably mounted on a vertical axle, the pulley wheels extending through the inner wall of the curved conveyor section, wherein at least one guide fork is provided in a region remote from the curved conveyor section, the or each guide fork having a first arm which extends over, and slidably contacts, the upper pulley wheel, and a second ram which extends between, and slidably contacts, the two pulley wheels.

BRIEF DESCRIPTION OF DRAWINGS

A curved section and guide assembly constructed in accordance with the invention will now be described, by way of example, with reference to the accompanying drawings, in which.

DESCRIPTION OF PREFERRED EMBODIMENT

Figure 1:
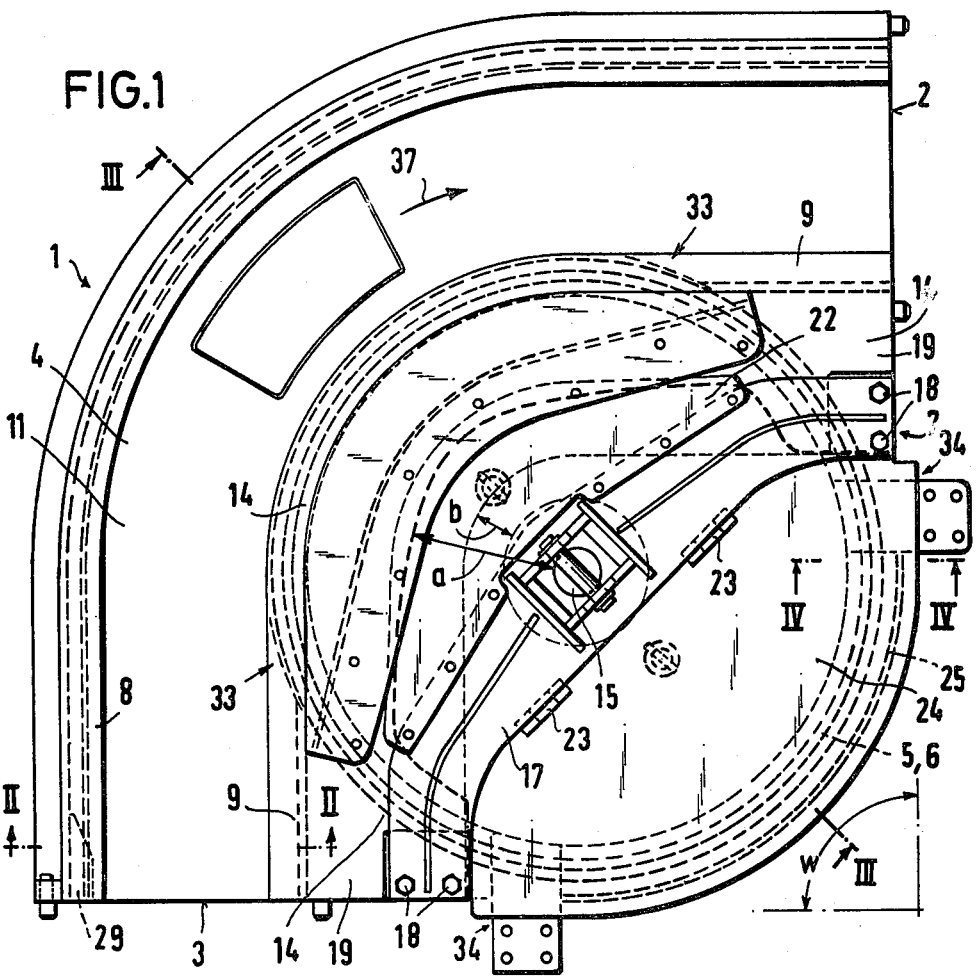
FIG. 1 is a plan view of the curved section and guide assembly.
Figure 3:
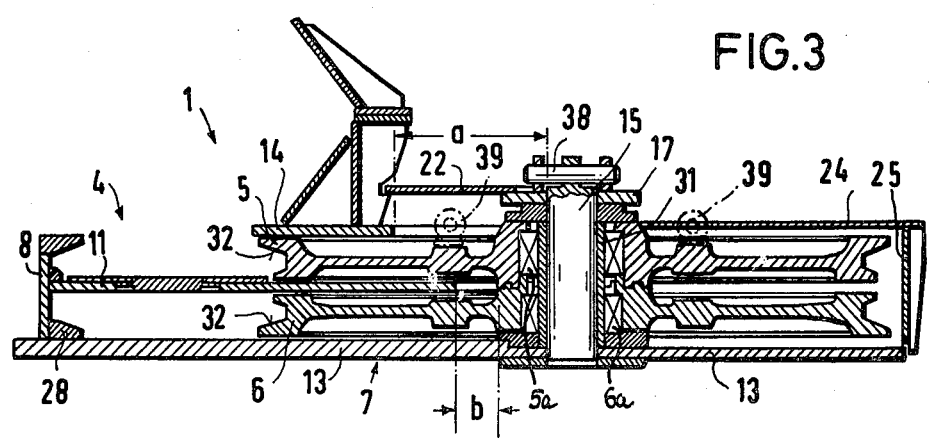
FIG. 3 is a cross-section taken on the line III—III of FIG. 1.

Referring to the drawings, FIG. 1 shows a curved section 1 of a scraper-chain conveyor, the curved section serving to connect two straight conveyor portions (not shown), one of which is connected to an end face 2 of the curved section, the other being connected to the other end face 3 of the curved section. The two end faces 2 and 3 lie at right-angles to one another, that is to say, the curved section 1 curves through an angle $w = 90°$. Typically, this is the angle between a mine longwall face and its roadway, so that the curved section 1 can be used to direct won material such as coal from the face to the roadway on the same conveyor. Obviously, the angle w could be larger or smaller than 90° to suit any required operating conditions. The curved section 1 has a conveying channel 4 (see FIG. 3), an upper pulley wheel 5 and a lower pulley wheel 6. The two pulley wheels 5 and 6 are protected by a housing indicated generally by the reference numeral 7.

The conveying channel 4 is delimited on its outer side by a wall 8, on its inner side by a wall 9 (which can be seen only in FIGS. 1 and 2), and at its base by a floor panel 11 which extends horizontally between the side walls. The scrapers 12 of the scraper chain arrangement are driven between the two side walls 8 and 9, the scrapers being guided above the floor panel 11 in the upper (conveying) run and beneath the floor panel in the lower (return) run. The scrapers 12 are fastened to a single, central chain (not shown) which is used to drive the scrapers along the conveyor.

Figure 2:
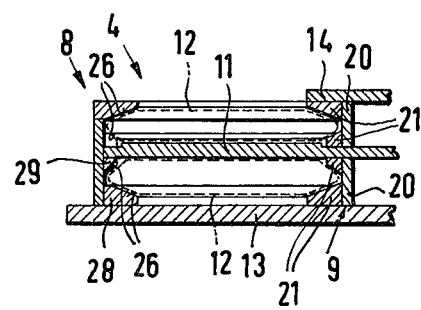
FIG. 2 is a cross-section taken on the line II—II of FIG. 1.
Figure 4:
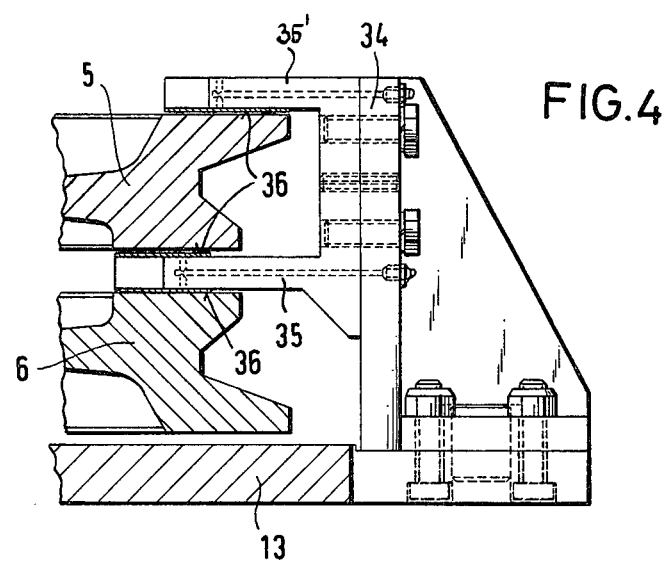
FIG. 4 is a cross-section taken on the line IV—IV of FIG. 1.

The base of the housing 7 is constituted by a generally quadrant-shaped base plate 13 which extends as far as the outer side wall 8 and as far as the two end faces 2 and 3 of the curved section 1. The inner portion of the base plate 13 is rounded off to correspond with the shape of the pulley wheels 5 and 6 (see FIG. 1). As best seen in FIG. 2, the inner side wall 9 extends upwardly from the base plate 13 and terminates at a cover plate 14 which forms part of the housing 7. The cover plate 14 projects radially inwardly of the inner side wall 9 and terminates at an edge which partially surrounds an axle 15 which rotatably supports the two pulley wheels 5 and 6. The central portion of the inner edge of the cover plate 14 is generally arcuate and is spaced from the axle 15 by a distance a. The ends of the cover plate 14 adjacent to the end faces 2 and 3 are wider than the remainder of the cover plate (see FIG. 1). The floor panel 11 passes through the inner side wall 9 and extends radially into the housing 7 between the two pulley wheels 5 and 6. The central portion of the inner edge of the floor panel 11 is generally arcuate and is spaced from the axle 15 by a distance b.

The lower end of the axle 15 engages with an aperture in the base plate 13, and the upper end of the axle passes through an aperture in a carrier plate 17. The upper end of the axle 15 is fastened to the carrier plate 17 by means of a bolt 38 (see FIG. 3). The carrier plate 17 extends across and over the housing 7 between the two widened end portions of the cover plate 14, the two ends of the carrier plate resting on these widened end portions. The carrier plate 17 is fastened at each end, to the cover plate 14, the floor panel 11 and the base plate 13, spacers (not shown) being arranged between the cover plate and the floor panel and between the floor panel and the base plate. In order to facilitate dismantlement, these parts are not connected together by long bolts which extend the entire depth of the housing 7, but by two sets of relatively short bolts 18, a first (upper) set of bolts connecting the carrier plate 17, the cover plate 14, the floor panel 11 and the spacers arranged between the floor panel and the base plate 13, and the second (lower) set connecting these spacers with the base plate 13. The spacers have laterally accessible openings which permit the nuts (not shown) to be screwed on and off the bolts 18. The bolts 18 are positioned adjacent to gusset plates 19, one gusset plate being situated in the region of each end face 2 and 3 of the curved section 1. Each gusset plate 19 extends between the wall 9 and the circumference of the pulley wheels 5 and 6. The housing 7 which is of welded construction is very stable in the regions of the gusset plates 19, this stability being obtained by welding flanges 20 to the cover plate 14 and the floor panel 11 (see FIG. 2), the flanges forming an inner wall for the curved section 1. This stability is enchanced by the firm connection afforded by the bolts 18, and by the provision of welded-on profiled members 21 (see FIG. 2).

On both sides of the carrier plate 17, the housing 7 is provided with top guard plates 22 and 24 which prevent mineral fragments entering the housing and jamming the pulley wheels 5 and 6. The guard plate 22 extends between the carrier plate 17 and the cover plate 14, and the guard plate 24 is arranged on the other side of the carrier plate, the guard plate 24 being pivotally connected to the carrier plate by means of hinges 23. The side of the housing 7 remote from the curved section 1 is closed by means of an arcuate wall 25.

Both ends of each of the scrapers 12 are bevelled to defined guide faces 26 of wedge-shaped form, these guide faces sliding in the side walls 8 and 9 of the conveying channel 4. In the lower run of the curved section 1, a guide wedge 28 (see FIG. 3) is provided on the base plate 13 at the outer side wall 8. This guide wedge 28 ensures that the outer edges of the scraper 12 are guided onto the straight conveyor section adjacent to the end face 3. Similarly, a guide wedge 29 is provided underneath the floor panel 11 at the outer side wall 8 for guiding the upper guide faces 26 of the scraper 12 in the lower runs.

The pulley wheels 5 and 6 are independently rotatably mounted by means of suitable anti-friction bearings 5a and 6a on a sleeve 31 (see FIG. 3) which surrounds the axle 15. The upper pulley wheel 5 rotates between the cover plate 14 and the floor panel 11, and the lower pulley wheel 6 rotates between the floor panel 11 and the base plate 13. Both pulley wheels 5 and 6 extend through the inner side wall 9 of the curved section 1 to such an extent that the inner side wall is tangential to annular grooves 32 formed in the circumferential edges of the pulley wheels.

The pulley wheels 5 and 6 are additionally guided in their planes of rotation by means of a pair of guide forks 34, each which is situated diametrically opposite a respective transition zone 33 (see FIG. 1) between the inner side wall 9 and the circumferential edges of the pulley wheels. Each guide fork 34 is detachably secured to the base plate 13 so that its two arms 35 and 35' grasp the upper pulley wheel 5 with sliding clearance. The lower arm 35 of each guide fork 34 is thicker than the upper arm 35' so that it guides the upper surface of the lower pulley wheel 6 with sliding clearance. The guide faces 36 of the guide fork arms 35 and 35' are coated with a wear resistant material. As the guide forks 34 are located at accessible points, they are easy to inspect, and, if necessary lubricate. Moreover, when their guide faces 36 becomes worn, the guide forks 34 can be replaced easily and quickly.

In operation, the scrapers 12 are drawn in the conveying direction 37 along the conveyor channel 4, the scrapers being guided between the side walls 8 and 9 of the curved section. The scrapers 12 in the upper (conveying) run are also guided by their contact with the floor panel 11. As they pass through the curved section 1, the scrapers 12 are pulled radially inwards against the pulley wheels 5 and 6 by the tension in the drive chain. Then, the guide faces 26 of the scrapers 12 engage with the annular grooves 32 of the pulley wheels 5 and 6. Because of the weight of the scrapers 12, the pulley wheels 5 and 6 are loaded axially as well as radially. This axial loading can be considerable if mineral fragments jam between the floor panel 11 and the scraper 12. It has been found that these axial loads are greatest in the transition zones 33. The additional guiding accomplished by the guide forks 34 helps take up these axial loads and protect the anti-friction bearings 5a and 6a against overloading and excessive wear.

The pulley wheels 5 and 6 can be dismantled (and fitted) both simply and quickly. For this purpose, it is merely necessary to remove the bolts 18 and the bolt 38. The carrier plate 17, the guide forks 34 and the wall 25 can then be removed. Next, the axle 15 is lifted slightly so that it loses its retention in the base plate 13. The assembly constituted by the pulley wheels 5 and 6, the bearings 5a and 6a and the sleeve 31 can be attached to a crane by means of eye bolts 39 and removed.

It will be apparent that the assembly described above could be modified so that the drive chain of the scraper assembly engages the grooves 32 in the circumferential edges of the pulley wheels 5 and 6.

We claim:

1. A curved section and guide assembly for a scraper-chain conveyor, the assembly comprising a curved conveyor section and a guide for guiding the scraper assembly of the conveyor around the curve, the curved conveyor section having a curved inner wall, a curved outer wall and a floor panel which define upper and lower runs for the scraper assembly which is constituted by a chain and a plurality of scrapers secured thereto, and the guide being constituted by two pulley wheels which are independently rotatably mounted on a vertical axle extending upwardly from a base plate arranged beneath the pulley wheels, a cover plate being arranged above the pulley wheels, the pulley wheels extending through the inner wall of the curved conveyor section, both the base plate and the cover plate being attached to said inner wall, and both the floor panel and the cover plate extending towards and being spaced radially from the axle, wherein the lower end of the axle is removably received in an opening in the base plate and the upper end of the axle is supported by and detachably connected to a carrier plate which extends over and which is detachably connected to the cover plate.

2. An assembly according to claim 1, wherein, in use, the pulley wheels guide the inner ends of the scrapers of the scraper assembly.

3. An assembly according to claim 1, wherein gusset plates are provided at each end of the curved conveyor section, each gusset plate extending from the inner wall of the curved conveyor section towards the pulley wheels.

4. An assembly according to claim 3, wherein the floor panel, the cover plate and the base plate are connected together in regions adjacent to the gusset plates.

5. An assembly according to claim 4, wherein spacers are provided between the base plate and the floor panel, and between the floor panel and the cover plate.

6. An assembly according to claim 5, wherein the spacers are provided with laterally accessible openings which permit the floor panel, the cover plate and the base plate to be connected together by means of nuts and bolts.

7. An assembly according to claim 6, wherein a first set of nuts and bolts connect the cover plate and the floor panel, and a second set of nuts and bolts connect the floor panel and the base plate.

8. An assembly according to claim 7, wherein the first set of nuts and bolts also connects the carrier plate to the cover plate.

9. An assembly according to claim 1, wherein the base plate extends outwardly of the inner wall of the curved conveyor section at least as far as the outer wall of the curved conveyor section and is connected thereto.

10. An assembly according to claim 1, wherein a first guard plate is pivotally connected to the carrier plate, the first guard plate covering that part of the assembly remote from the curved conveyor section.

11. An assembly according to claim 10, wherein a second guard plate is attached to the carrier plate, the second guard plate covering the space between the carrier plate and the cover plate.

12. An assembly according to claim 2, wherein one end portion of the lower run of the curved conveyor section is provided with a guide wedge for guiding, in use, the outer end of the scraper assembly.

13. An assembly according to claim 1, wherein at least one guide fork is provided in a region remote from the curved conveyor section, the or each guide fork having a first arm which extends over, and slidably contacts, the upper pulley wheel, and a second arm which extends between, and slidably contacts, the two pulley wheels.

14. An assembly according to claim 13, wherein there are two guide forks each of which is arranged diametrically opposite a transition zone between the inner wall of the curved conveyor section and the circumferential edge portions of the pulley wheels.

15. An assembly according to claim 13, wherein the faces of the arms of the guide forks which slidably contact the pulley wheels are coated with a wear-resistant material.

16. A scraper-chain conveyor comprising first and second sets of conveyor sections which are joined together by a curved conveyor section having a curved inner wall, a curved outer wall and a floor panel which define upper and lower runs for a scraper assembly constituted by a chain and a plurality of scrapers secured thereto, and a guide for guiding the scraper assembly round the curved conveyor section, the guide being constituted by two pulley wheels which are independently rotatably mounted on a vertical axle extending upwardly from a base plate arranged beneath the pulley wheels, a cover plate being arranged above the pulley wheels, the pulley wheels extending through the inner wall of the curved conveyor section, both the base plate and the cover plate being attached to said inner wall, and both the floor panel and the cover plate extending towards and being radially spaced from the axle, wherein the lower end of the axle is detachably supported by the base plate and the upper end of the axle is supported by and detachably connected to a carrier plate which extends over and which is detachably connected to the cover plate.

* * * * *